United States Patent [19]

Futaba

[11] Patent Number: 4,624,283

[45] Date of Patent: Nov. 25, 1986

[54] ROTARY CONTROL VALVE OF POWER STEERING SYSTEM AND METHOD OF PRODUCING SPOOL VALVE MEMBER

[75] Inventor: Takeshi Futaba, Yao, Japan

[73] Assignee: Koyo Auto-Mech. Co. Ltd., Kashihara, Japan

[21] Appl. No.: 565,556

[22] Filed: Dec. 27, 1983

[30] Foreign Application Priority Data

Dec. 27, 1982 [JP] Japan .................. 57-226781

[51] Int. Cl.$^4$ ............... F16K 11/12; B62D 5/083; F15B 9/10
[52] U.S. Cl. .................. 137/625.24; 137/625.3; 91/375 A
[58] Field of Search .............. 137/625.32, 625.31, 137/625.3, 625.21–625.24; 91/375 A, 375 R, 375; 180/149, 148, 132

[56] References Cited

U.S. PATENT DOCUMENTS

| | | | |
|---|---|---|---|
| 2,586,755 | 2/1952 | Wilson | 51/326 |
| 2,683,431 | 7/1954 | Morse | 51/281 R |
| 4,290,452 | 9/1981 | Takahashi et al. | 91/375 R |
| 4,452,274 | 6/1984 | Haga et al. | 137/625.22 |

FOREIGN PATENT DOCUMENTS 197706 6/1977 U.S.S.R. .................. 51/326

*Primary Examiner*—Martin P. Schwadron
*Assistant Examiner*—John S. Starsiak, Jr.
*Attorney, Agent, or Firm*—Fleit, Jacobson, Cohn & Price

[57] ABSTRACT

A rotary control valve for an automotive power steering system and a method for making such a valve. The valve includes a tubular valve body and a spool valve member rotatable within the valve body, each of the valve body and spool valve having axially extending grooves. The spool valve member includes control edges formed at the axial grooves to effect control of the area of an opening defined by the edges of the axial grooves of the spool member and the axial grooves of the valve body. The control edges extend parallel to the axial grooves of the spool valve member along substantially the entire length thereof and are defined by at least one arcuate surface portion formed on the spool valve member at axially extending edges of the grooves. The arcuate surface portion has an axis that extends parallel to the axial grooves of the spool valve member.

6 Claims, 11 Drawing Figures

ROTARY CONTROL VALVE OF POWER STEERING SYSTEM AND METHOD OF PRODUCING SPOOL VALVE MEMBER

BACKGROUND OF THE INVENTION

This invention relates to a rotary control valve of a power steering system of an automotive vehicle comprising a torsion bar connecting an input shaft and an output shaft together, a spool valve member secured to the input shaft and a valve body loosely fitted to the valve member and secured to the output shaft, the spool valve member and the valve body both being formed with axial grooves for supplying and discharging a pressure fluid from a hydraulic pump and each axial groove being formed with control edges for effecting control of the area of an opening defined by the axial grooves and the flow rate of the pressure fluid by the relative angular displacement of the spool valve member with respect to the valve body as the torsion bar is twisted by a load applied to the output shaft, and more particularly it is concerned with the spool valve member and a method of producing same.

In this type of rotary control valve, the input shaft is connected to a steering wheel of an automotive vehicle and the output shaft is connected to a pinion when the rotary control valve is used with a power steering system of a rack-and-pinion arrangement. When the rotary control valve is incorporated in a power steering system of a ball-nut arrangement, the input shaft is connected to a steering wheel of an automotive vehicle and the output shaft is connected to a ball-nut shaft, as is well known. The spool valve member of the rotary control valve is operative to supply a pressure fluid to a hydraulic cylinder for hydraulically actuating the output shaft of the power steering system or to discharge same therefrom in accordance with the direction in which the automotive vehicle is driven, from a hydraulic pump which is driven for operation by an internal combustion engine of the automotive vehicle, for example. In this case, it is necessary that the volume of the pressure fluid supplied to and discharged from the hydraulic cylinder be increased to reduce the force necessary for manipulating the steering wheel in the range of low engine speed as the automotive vehicle travels through the town or is put into its garage or is brought to a stop and reduced to zero to increase the force necessary for manipulating the steering wheel in the range of high engine speed to ensure the stability of the travel. In view of the foregoing, it is considered necessary that the power steering system have a characteristic such that the automotive vehicle can be driven manually without requiring the pressure fluid being supplied from the hydraulic pump to the hydraulic cylinder. Particularly, it is considered necessary that the rigidity of the steering wheel be increased in the range of high engine speed to obtain improved steering characteristics and the characteristics of the power steering system be improved in the range of minuscule angle steering or the range of low pressure of the pressure fluid. Thus, to meet the aforesaid requirement, various proposals have hitherto been made to provide improvements in the prior art. For example, one of such proposals involves the additional use of spring reaction means for increasing the rigidity of the steering wheel while the automotive vehicle travels straight ahead. Another proposal contemplates the additional use of vehicle speed sensor means to cause the steering force to vary in conformity with the vehicle speed. The proposals are also concerned with the control edges of axial grooves of the spool valve member. One of them envisages forming one or two inclined surface portions of a rectangular shape having a predetermined angle with respect to the outer side of the spool valve member which extend along the entire length of the axial grooves. Another proposal provides control edges simultaneously as hobbing is performed to form the axial grooves of the spool valve member. The last-mentioned two proposals aim at rendering complex in shape the control edges of the spool valve member serving as a control valve member for the pressure fluid. However, some disadvantages are associated with these proposals of the prior art. When the control edges have one or two inclined surface portions of a rectangular shape, it would be impossible to provide a desired characteristic with respect to a rise in pressure from the low pressure range to the high pressure range due to the fact that the area of the opening has a high changing rate with respect to the rotational angle of the spool valve member relative to the valve body. Also, difficulties would be faced with in providing the inclined surface portion or portions by working on the spool valve member. Thus, to obtain the desired control characteristics, it would be necessary to give high precision finishes to parts in various production steps, thereby causing an increases in working costs. Meanwhile, when the control edges are formed simultaneously as the axial grooves of the spool valve member are formed by hobbing, limitations would be placed on the configuration of the control edges not only by the radius of the axial grooves but also by the machining operation which should be performed following the hobbing operation. Thus, the control edges provided by this process could not have the desired pressure control characteristics as would be the case with the control edges having the inclined surface portion or portions described hereinabove. To cope with this situation, a further proposal has been made, as described in Japanese Patent Laid-Open No. Sho-57-198170, for example, to form at least one control edge in each axial groove of the spool valve member to obtain the desired control characteristics. However, this proposal has the disadvantage that, whem emphasis is placed on improving the control characteristics in the range of high engine speed, the control characteristics would deteriorate in the range of low engine speed, and, when emphasis is placed on improving the control characteristics in the range of low speed, the control characteristics would deteriorate in the range of high engine speed. Also, the pressure characteristic would be such that a rise in pressure with respect to a steering torque from the range of low presure to the range of high pressure would show a gentle slope, and it would be impossible to show a linear change over a prolonged period of time while a rise from the range of low pressure to the range of high pressure would be slow. Thus, even if a multiplcity of stages of control edges could be designed that would enable control characteristics substantially the same level as the target control characteristics to be achieved, it would be necessary to give fine finishes to the parts, and difficulties would be experienced in performing operations for forming the control edges which involve changing elevated portions to depressed portions. Also, in performing machining when the spool valve member is worked on to form control edges, it is necessary that the surfaces of the control edges be given with a high degree of precision finishes because the spool valve member is machined in the axial direction when the control edges are formed and the machined surfaces are at a right angle to the direction of flow of the pressure fluid, thereby giving rise to noises as the pressure fluid flows. This would reduce the service life of the cutters and increases the cost of operations.

SUMMARY OF THE INVENTION

This invention has been developed for the purpose of obviating the aforesaid disadvantages of the prior art. Accordingly, the invention has as its object the provision of a spool valve member of a rotary control valve of a power steering system which is provided with control edges having desired control characteristics that can be formed in one processing step in a manner to enable a pressure fluid to be supplied to the power steering system and discharged therefrom as desired.

The aforesaid object is accomplished according to the invention by providing, in a spool valve member of a rotary control valve of a power steering system, the spool valve member with control edges extending along substantially the entire length of the axial grooves of the spool valve member in parallel relation thereto which define therebetween at least one arcuate surface portion as seen in a transverse sectional view of a valve body.

DESCRIPTION OF THE PREFERRED EMBODIMENTS

Figure 1:
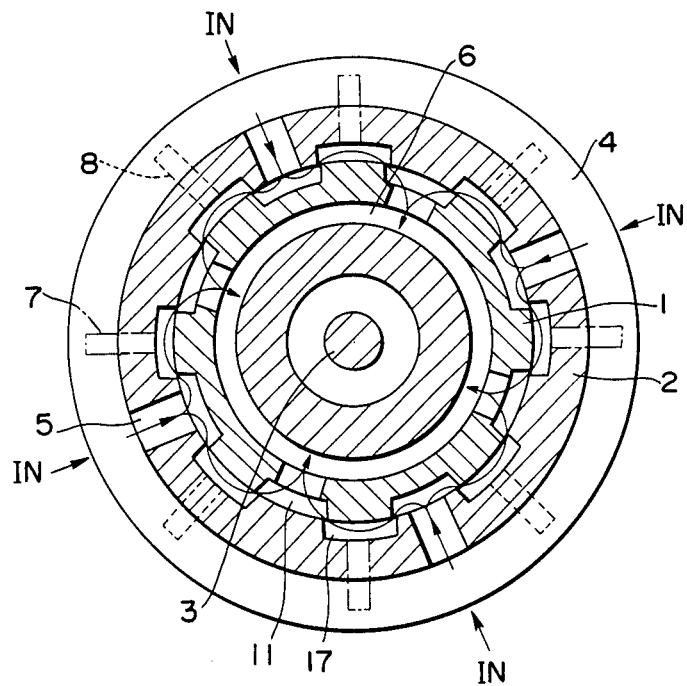
FIG. 1 is a transverse sectional view of the spool valve member of a rotary control valve of a power steering system of the prior art.

Referring to FIG. 1, a spool valve member of a rotary control valve is connected to an input shaft, not shown, and loosely fitted to a valve body 2 connected to an output shaft, not shown, the input shaft being connected to the output shaft through a torsion bar 3. The valve body 2 is loosely fitted in a valve housing 4 while the input and output shafts are journalled by bearings located in the valve housing 4 or a case of the power steering system connected to the valve housing 4, against relative movements in a radial direction. Arrows in the figure show directions in which a pressure fluid is supplied from a hydraulic pump through an annular groove formed on an inner peripheral surface of the valve housing 4 and via feeding ports 5 to the rotary control valve and the pressure fluid is discharged from the rotary control valve through an annular groove 6 defined between the spool valve member 1 and the torsion bar 3 into an oil sump of the hydraulic pump. Ports 7 and 8 shown in phantom lines are maintained respectively in communication with annular grooves formed on an inner peripheral surface of the valve body 2 which in turn are maintained in communication with respective pressure chambers located on left and right sides of a hydraulic cylinder for hydraulically operating the output shaft of the power steering system. The feeding ports 5 and the annular grooves for controlling the hydraulic cylinder are spaced apart from each other axially of the valve body 2.

The spool valve member 1 and the valve body 2 are formed respectively with axial grooves 11 and 17 for feeding the pressure fluid from the hydraulic pump to the rotary control valve and discharging same therefrom.

Figure 2:
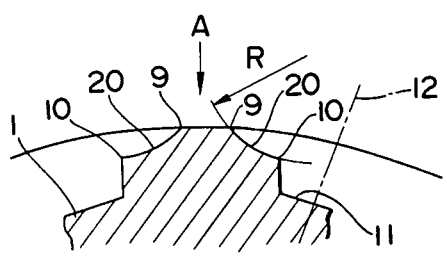
FIG. 2 is a fragmentary transverse sectional view, shown on an enlarged scale, of the first embodiment of the invention as incorporated in the spool valve member shown in FIG. 1.
Figure 3:
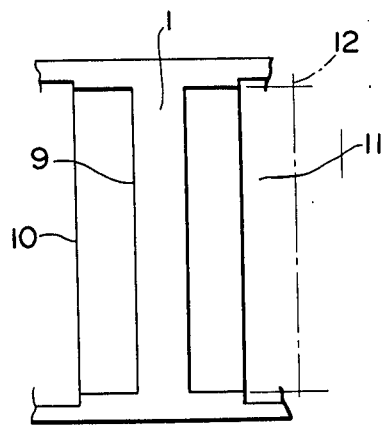
FIG. 3 is a view as seen in the direction of an arrow A in FIG. 2.
Figure 9:
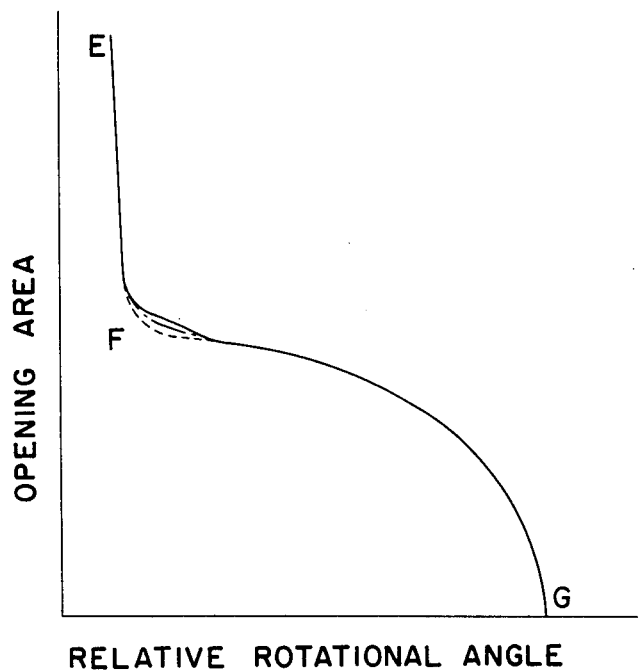
FIG. 9 is a diagrammatic representation of the relation between the relative rotational angle of the spool valve member and the area of the opening.
Figure 10:
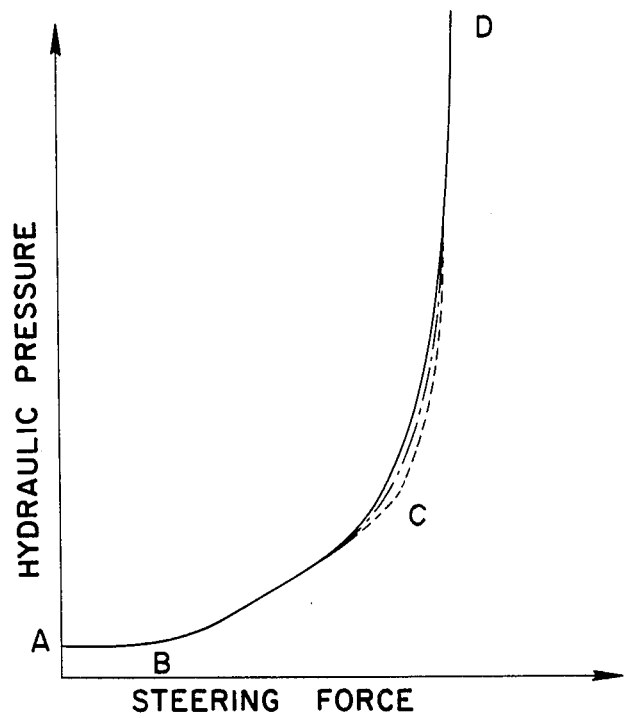
FIG. 10 is a diagrammatic representation of the relation between the steering force and the pressure.

Referring to FIG. 2, the spool valve member 1 is shown as being provided with a plurality of edge portions each having an arcuate surface portion 20 of a radius of rotation R which is defined between a first control edge 9 and a second control edge 10 which, as shown in FIG. 3, extend along substantially the entire length of axial grooves 11 formed at the spool valve member 1. FIGS. 9 and 10 show control characteristics of the spool valve member 1 of the aforesaid construction indicated by broken line curves against the desired control characteristics which are represented by solid line curves. It will be seen that the control characteristics of the spool valve member 1 shown in FIG. 2 approximate the desired characteristics.

Figure 4:
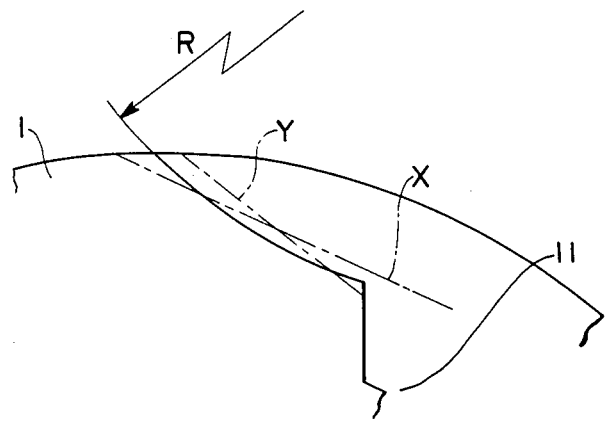
FIG. 4 shows the control edge portion in the form of an arc R according to the invention and the two-stage control edge portion of the prior art.
Figure 11:
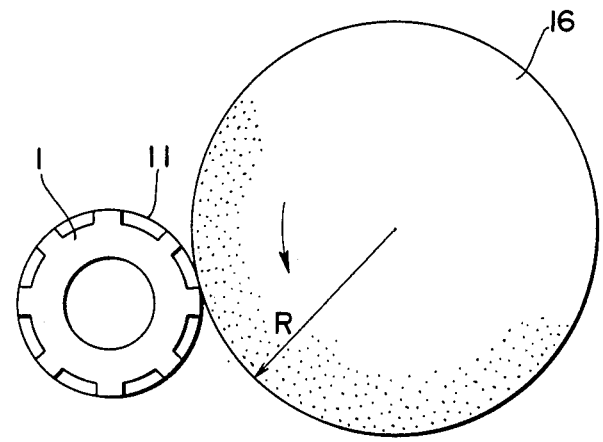
FIG. 11 shows a process for forming the control edges of the spool valve member.

The first control edge 9 and second control edge 10 shown in FIG. 2 are formed by a novel process. In the prior art, it has hitherto been customary to provide control edges of the axial grooves 11 by moving a cylindrical machining tool linearly in X an Y directions in two stages as shown in FIG. 4 or in one stage in the X or Y direction. In the novel process according to the invention, however, a machining tool 16 having a cylindrical machining surface e shown in FIG. 5 and equal to the arcuate surface portion 20 of the radius of rotation R shown in FIG. 2, is arranged in such a manner that the axis of its rotation is disposed parallel to a center plane 12 of each axial groove 11 of the spool valve member 1 and used to machine the spool valve member 1 in such a manner that the machining tool is forced against the spool valve member 1 while rotating it at right angles to the direction in which the axial grooves 11 extend. Each of the control edges 9 and 10 provided to the axial grooves 11 is formed by indexing the spool valve member 1. This process is shown in FIG. 11.

Figure 5:
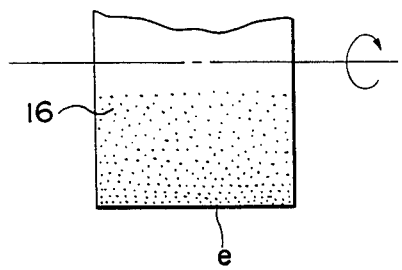
FIG. 5 shows an example of the tool used for providing the control edges according to the invention.
Figure 6:
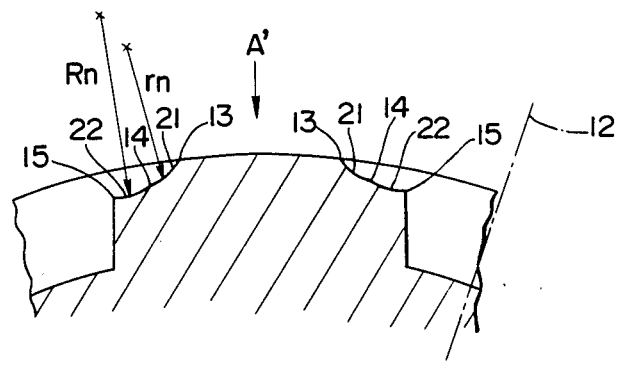
Fig.6 is a fragmentary transverse sectional view, shown on an enlarged scale, of the second embodiment of the invention.
Figure 7:
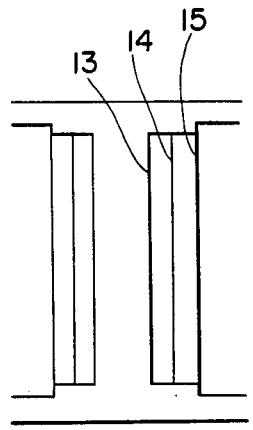
FIG. 7 is a view as seen in the direction of an arrow A' in FIG. 6.
Figure 8:
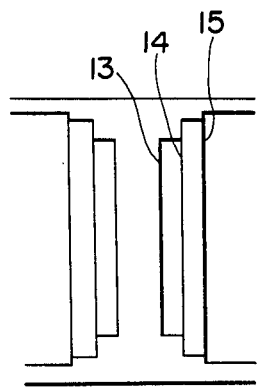
FIG. 8 is a view similar to FIG. 7 but showing a modification of the second embodiment as seen in the direction of the arrow A' in FIG. 6.

FIGS. 6-8 show a second embodiment of the invention in which a plurality of edge portions each have a composite arcuate surface portion including surface portions defined by three control edges 13, 14 and 15. Control characteristics of the spool valve member 1 having the construction shown in FIG. 6 are represented in FIGS. 9 and 10 by dash-and-dot line curves which show that the control characteristics of the second embodiment are superior to those of the first embodiment. In forming the control edges 13, 14 and 15, the machining tool 16 having the cylindrical machining surface e as shown in FIG. 5 is used, as is the case with the formation of the control edges 9 and 10 of the first embodiment. In forming the control edges 13, 14 and 15 shown in FIGS. 6-8, a suitable radius of rotation $R_n$ or $r_n$ is selected for each machining tool 16 having the cylindrical machining surface e to form arcuate surface portions 21 and 22 shown in FIG. 6 by forcing the machining tool 16 against the spool valve member 1 while rotating the machining tool 16 in a direction at right angles to the direction in which the axial grooves 11 extend after arranging the axis of the rotation of the machining tool 16 parallel to the center plane 12 of each axial groove 11. Each of the control edges 13, 14 and 15 provided to the axial grooves 11 is formed by indexing the spool valve member 1.

As described hereinabove, the control edges according to the invention are provided to the spool valve member 1 by using the machining tool 16 shown in FIG. 5. The machining tool 16 may be formed of either borozon or diamond. When the machining tool 16 is formed of diamond, it has an elongated service life. Thus, the process according to the invention enables the control edges to be formed at the spool valve member 1 in a single process step.

FIG. 9 is a diagram in which the abscissa represents the relative rotational angle of the spool valve member 1 and the valve body 2 and the ordinate indicates the area of the opening defined by the axial grooves. In the figure, the solid line curve represents the desired characteristic while the dashed line curve represents the characteristic of the first embodiment of the invention in which the spool valve member 1 has control edges with a single arcuate surface portion, and the dash-and-dot line curve represents the characteristic of the second embodiment in which the spool valve member 1 has control edges with a plurality of arcuate surface portions.

FIG. 10 is a diagram in which the abscissa represents the steering force and the ordinate indicates the hydraulic pressure applied to the hydraulic cylinder. In the figure, the solid line curve represents the desired characteristic while the dashed line curve represents the characteristic of the first embodiment of the invention and the dash-and-dot line curve represents the characteristic of the second embodiment.

What is claimed is:

1. A rotary control valve of a power steering system comprising:
    a housing, a rotatable input shaft and a rotatable output shaft extending from said housing;
    a torsion bar connecting said input shaft and said output shaft, a spool valve member having an axis and connected to and rotatable with the input shaft, said spool valve member being formed with axial grooves ;and
    a valve body positioned within said housing and loosely rotatably receiving said spool valve member, said valve body secured to the output shaft and being formed with axial grooves corresponding to said axial grooves of said spool valve member for feeding and discharging the pressure fluid to and from said control valve when said axial grooves in said spool valve member are in communication with said axial grooves in said valve body;
    wherein the axial grooves of said spool valve member include control edges operative to effect control of the area of an opening defined by edges of the axial grooves of the spool valve member and the axial grooves of the valve body for feeding the pressure fluid and discharging same, the area of said opening controlled by the relative angular displacement of the spool valve member with respect to the valve body as the torsion bar is twisted by a load applied to the input shaft, to thereby control the flow rate of the pressure fluid through said control valve, said control edges extending parallel to said axial grooves of said spool valve member along substantially the entire length thereof and defined by at least one arcuate surface portion formed on said spool valve member at axially extending edges of said grooves, said arcuate surface portion having an axis extending parallel to the axial grooves of said spool valve member.

2. A rotary control valve of a power steering system comprising:
    a housing, a rotatable input shaft and a rotatable output shaft extending from said housing;
    a torsion bar connecting said input shaft and said output shaft, a spool valve member having an axis and connected to and rotatable with the input shaft, said spool valve member being formed with axial grooves; and
    a valve body positioned within said housing and loosely rotatably receiving said spool valve member, said valve body secured to the output shaft and being formed with axial grooves corresponding to said axial grooves of said spool valve member for feeding and discharging the pressure fluid to and from said control valve when said axial grooves in said spool valve member are in communication with said axial grooves in said valve body;
    wherein the axial grooves of said spool valve member include control edges operative to effect control of the area of an opening defined by edges of the axial grooves of the spool valve member and the axial grooves of the valve body for feeding the pressure fluid and discharging same, the area of said opening controlled by the relative angular displacement of the spool valve member with respect to the valve body as the torsion bar is twisted by a load applied to the input shaft, to thereby control the flow rate of the pressure fluid through said control valve, said control edges extending parallel to said axial grooves of said spool valve member along substantially the entire length thereof and defined by at least one arcuate surface portion formed on said spool valve member at axially extending edges of said grooves, said arcuate surface portion having an axis extending parallel to the axial grooves of said spool valve member, wherein said control edges include three control edges that extend outwardly of and along the arcuate surface portion.

3. A rotary control valve in accordance with claim 2 wherein said control edges are defined by a pair of intersecting arcs having axes that extend parallel to the axial grooves of said spool valve member.

4. A rotary control valve in accordance with claim 3 wherein said intersecting arcs each have a different radius of curvature.

5. A rotary control valve in accordance with claim 1 wherein said control edges are formed with a cylindrical grinding tool having an axis of rotation parallel to the axis of said spool valve member.

6. A rotary control valve in accordance with claim 1 wherein said control edges extend along less than the entire axial length of said axis grooves in said spool valve member.

* * * * *